(12) United States Patent
Sherman

(10) Patent No.: US 11,742,933 B1
(45) Date of Patent: Aug. 29, 2023

(54) ANTENNA CONTROL USING REAL-TIME SENSOR FUSION

(71) Applicant: Amazon Technologies, Inc., Seattle, WA (US)

(72) Inventor: Ryan M. Sherman, Washington, DC (US)

(73) Assignee: Amazon Technologies, Inc., Seattle, WA (US)

( * ) Notice: Subject to any disclaimer, the term of this patent is extended or adjusted under 35 U.S.C. 154(b) by 421 days.

(21) Appl. No.: 16/945,537

(22) Filed: Jul. 31, 2020

(51) Int. Cl.
| | |
|---|---|
| *H04B 7/185* | (2006.01) |
| *G01S 3/42* | (2006.01) |
| *G01S 13/72* | (2006.01) |

(52) U.S. Cl.
CPC ............ *H04B 7/18513* (2013.01); *G01S 3/42* (2013.01); *G01S 13/723* (2013.01)

(58) Field of Classification Search
CPC .............. H04B 7/1851; H04B 7/18513; H04B 7/18521; H04B 7/18552; H04B 7/19; H04B 7/195; H04B 7/18519; G01S 19/45; G01S 19/115; G01S 3/48; G01S 19/43; G01S 3/7862; G01S 19/46; H01Q 1/125; H01Q 25/02; H01Q 3/08; H01Q 3/005; H01Q 3/02; G01S 19/40; G01S 3/023; G01S 19/06; G01S 19/07; G01S 5/14; G01S 3/42; G01S 13/723
See application file for complete search history.

(56) References Cited

U.S. PATENT DOCUMENTS

| | | | | |
|---|---|---|---|---|
| 5,257,759 | A  * | 11/1993 | Bender | |
| 5,999,127 | A  * | 12/1999 | Dezelan | |
| 7,436,359 | B1 * | 10/2008 | Rose | |
| 10,234,532 | B2 * | 3/2019 | Uego et al. | |
| 10,761,215 | B2 * | 9/2020 | Kido et al. | |
| 11,095,363 | B2 * | 8/2021 | Buer et al. | |
| 2012/0038508 | A1 * | 2/2012 | Mizuochi et al. | |
| 2017/0254903 | A1 * | 9/2017 | Johnson et al. | |
| 2019/0230040 | A1 * | 7/2019 | Engelen | |
| 2020/0200853 | A1 * | 6/2020 | Horimoto et al. | |
| 2021/0105761 | A1 * | 4/2021 | Cheng et al. | |
| 2021/0223405 | A1 * | 7/2021 | Mu | |

FOREIGN PATENT DOCUMENTS

| | | |
|---|---|---|
| CN | 113783600 A  * | 12/2021 |
| WO | 2022079278 A2* | 4/2022 |

OTHER PUBLICATIONS

Zhang Y. et al, "An Improved Orbit Model of Space Target Radar Based on Least Square Method and Its Program Implementation", Hindawi Wireless Communications and Mobile Computing, volume 2022, Article ID 2341442, pages 1-10, https://doi.org/10.1155/2022/23414422022. (Year: 2022).*

* cited by examiner

*Primary Examiner* — Lana N Le
(74) *Attorney, Agent, or Firm* — Klarquist Sparkman, LLP

(57) ABSTRACT

Systems and methods are disclosed for controlling an antenna during communication with a satellite using satellite measurement data from multiple data sources. The satellite measurement data may include real-time positioning information derived from output of an onboard component of the satellite and/or received from a plurality of disparate data sources during a communication window between the satellite and the antenna. The satellite measurement data may be provided to an orbit determination (OD) service and used to generate updated ODs for the satellite during the communication window. The antenna may be controlled to adjust pointing angles during the communication window based on the updated ODs.

20 Claims, 7 Drawing Sheets

ANTENNA CONTROL USING REAL-TIME SENSOR FUSION

BACKGROUND

Satellites are increasingly employed by various independently operating entities (e.g., businesses, universities, or governments) for applications such as weather, surface imaging, communications, data transmission, space measurements, geosynchronous positioning, etc. In many examples, the owner or operator of the satellite is primarily concerned with the payload operation (e.g., the function performed by the satellite), which generally requires establishing a communication link between a satellite ground station and the orbiting satellite for transmission of data therebetween. In order to establish a communication link, the satellite ground station performs acquisition of signal (AoS) based on the location of the satellite in its orbit at a specific time.

The owner or operator of the satellite thus has to provide to the ground station service an orbit determination (OD) for the satellite. OD is the empirical estimation of a satellite's trajectory determined using statistical methods, physical force and acceleration models, and sensor measurements. OD can then be used to produce ephemerides (e.g., table or data file of calculated satellite positions) and to produce, from the ephemerides, acquisition products (e.g., two-line element (TLE) set that encodes orbital elements, orbit ephemeris message (OEM) that specifies a position and velocity of an object at multiple epochs within a given time range, an improved inter-range vector (IIRV), etc.).

DETAILED DESCRIPTION

Figure 1:
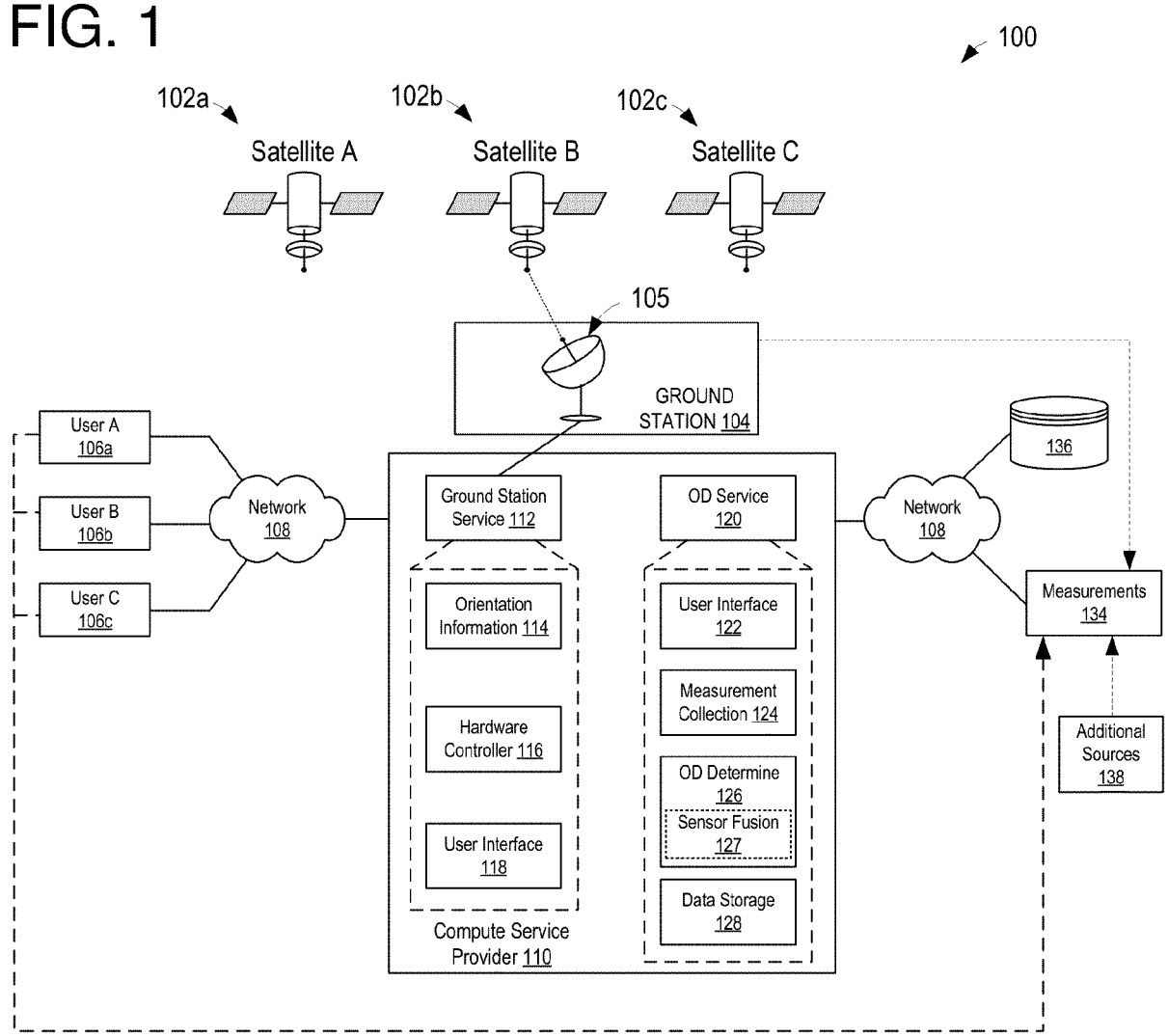
FIG. 1 is a simplified explanatory diagram of a satellite ground station service with orbit determination, according to one or more embodiments of the disclosed subject matter.

Ground stations may have high-gain antennae (HGAs) and/or low-gain antennae (LGAs). HGAs are highly performant, directional antennae. LGAs are low-bandwidth, omni-directional antennae and are often used for backup. Antenna pointing accuracy directly affects the probability of Acquisition of Signal (pAoS) and the quality of service (QoS). Data rate is directly proportional to pointing accuracy. A higher data rate is beneficial for the client because it minimizes their contact time, which in turn maximizes antenna utilization (across clients).

HGA pointing is controlled by an antenna pointing method. Two pointing methods are currently used in industry: Program Track and Auto Track. However, each of these methods has features that reduce pointing accuracy, usability/compatibility, and/or other limitations. For example, Program Track is an open-loop control law. An HGA in Program Track follows a predetermined satellite path without deviation. This path is often days old, and is often kilometers or tens of kilometers in error. This levies a prediction accuracy requirement on the mission operations team. Auto Track is a closed-loop control law. Auto Track is the utilization of one measurement type (angles) from one measurement source (the HGA being controlled). An HGA in Auto Track attempts to follow a RF beacon transmitted by the target satellite. Auto Track therefore requires a beacon RF signal, is limited in accuracy, and is prone to error due to complex radiation patterns of the RF signal and the presence of interference (e.g., from other satellites, terrestrial towers, etc.).

The disclosure provides an antenna pointing method and associated technologies that may be referred to in some examples as Sensor-fused Program Track. Sensor fusion may include taking measurements from disparate sources and convolving the measurements in order to reduce uncertainty of a solution to a function that uses the measurements (e.g., an orbit determination). For example, the disclosed mechanisms fuse real-time telemetry and tracking into HGA pointing information to allow for continual updates of antenna pointing in real-time (e.g., while the antenna is in communication with the satellite). The use of real-time sensor fusion (e.g., a Sensor-Fused Program Track antenna pointing method) as described herein results in higher pAoS and QoS than other mechanisms, such as the above-described Program Track and Auto Track approaches to antenna pointing. For example, updates to satellite positioning information in other mechanisms are not applied to antenna pointing configurations until a next communication attempt. This means that the other mechanisms utilize antenna pointing estimates that are based on measurements that are outdated by the time communication with the satellite is to be established, resulting in the above-described reduction in pointing accuracy and associated communication performance. In contrast, the real-time sensor fusion described herein allows multiple orbit determination calculations to be made while in communication range of a satellite, which can be applied to continually adjust antenna pointing during the communication window with the satellite to adapt to real-time changes in satellite trajectory/positioning, thereby increasing pAoS, connectivity time, and QoS. Real-time sensor fusion also enables unconventional workflows and may incorporate Auto Track angles, Global Positioning System (GPS) or other satellite-based navigation system telemetry, and/or ranging into the pointing of the HGA to yield the advantages described above.

Referring to FIG. 1, a network setup 100 for multiple users 106*a*-106*c* to communicate with multiple respective satellites 102*a*-102*c* via one or more satellite ground stations 104 is shown. Users 106*a*-106*c* can be respective owners of satellites 102*a*-102*c*, respective operators of satellites 102*a*-102*c*, or any other user of ground station service 112 otherwise authorized to have access to satellites 102*a*-102*c*. Although three users, three satellites, and a single ground station are shown in FIG. 1, any number of users, satellites, and ground stations is possible, and embodiments are not limited to the illustrated numbers.

Users 106a-106c can communicate via network 108 with ground station service 112 to schedule communication sessions between satellites 102a-102c and ground station 104 and receive data from scheduled communication sessions. Ground station 104 of ground station service 112 can include one or more satellite antennas 105, software defined radios, and/or modems to communicate with satellites 102a-102c using radio signals. Based on instructions received from users 106 at ground station service 112 via network 108, the ground station 104 can receive data downlinked from the satellites 102, monitor health and status of satellites 102, and/or provide commands to perform tasks or uplink data to the satellites 102. Although shown as being included in ground station 104, it is to be understood that antenna 105 may additionally or alternatively represent one or more antennas that are controllable by the ground station (e.g., as part of a full or partial/reservation-based control scheme) while being owned by another entity and/or located remotely from the ground station.

Network 108 can include any suitable combination of networking hardware and protocols that establish network-based communications with compute service provider 110. For example, network 108 can comprise the various telecommunications networks and service providers that collectively implement the Internet. Alternatively or additionally, network 108 can include private networks, such as local area networks (LANs) or wide area networks (WANs), and/or public or private wireless networks. For example, a given user 106a and compute service provider 110 may each be respectively provisioned within enterprises having their own internal networks. In such an example, network 108 can include hardware and software to establish a networking link between user 106a and the Internet, and between the Internet and compute service provider 110. In some embodiments, users 106 may communicate with compute service provider 110 using a direct connection rather than network 108.

Ground station service 112 can be part of compute service provider 110, which may provide one or more services (such as various types of cloud-based computing or storage) accessible via network 108 to users 106a-106c. For example, compute service provider 110 may include numerous data centers hosting various resource pools, such as collections of physical and/or virtualized computer servers, storage devices, networking equipment and the like, that implement and distribute the infrastructure and services offered by the compute service provider 110. In some embodiments, compute service provider 110 can provide computing resources, such as a virtual compute service, data storage service (e.g., block-based storage service or various other storage types, such as object/key-value based data stores or various types of database systems), and/or any other type of network-based service. Users 106a-106c can access the services offered by compute service provider 110 via network 108. Similarly, the network-based services can communicate with and/or make use of each other to provide different services. For example, computing resources offered to users in units called "instances," such as virtual or physical compute instances or storage instances, may make use of other resources.

In some embodiments, the ground station service 112 can coordinate with an OD service 120, which can also be part of compute service provider 110, in order to determine a target orientation for an antenna of the ground station 104 to enable the ground station to communicate with a satellite (e.g., a targeted one of satellites 102a-102c) requested by one of the users 106. In particular, the ground station service 112 can request that the OD service 120 calculate and return an OD pertaining to the user-requested satellite. The dotted line box corresponding to ground station service 112 illustrates a logical view of some of services or modules that may be offered by ground station service 112, for example, orientation information determination 114, ground station hardware control 116, and user interface 118. In embodiments, the user interface 118 can be a web-based graphical user interface (GUI) or an application programmatic interface (API), for example, when the user 106 programmatically submits the request. For example, the API of user interface 118 can function as an endpoint that allows programmatic integration of the ground station service 112 into existing satellite operation systems. The user interface 118 may be configured to receive requests and/or other data from the users (e.g., data to be propagated to a requested satellite) and to transmit client data (e.g., requested data from the satellite or other information) back to the requesting user.

Orientation information determination module 114 of the ground station service 112 can convert the OD returned by the OD service 120 (described in more detail below) into an orientation (e.g., point angles) for an antenna 105 of the ground station 104 for communication with the requested satellite. The hardware control module 116 can then translate the orientation into appropriate motor control signals that move the antenna 105 of the ground station 104 to point at the requested satellite for communication therewith (e.g., in accordance with a request from the user 106).

The dotted line box corresponding to OD service 120 illustrates a logical view of services or modules that may be offered by OD service 120, for example, a user interface 122, a measurement collection service 124, an OD determination service 126 including a sensor fusion process 127, and data storage service 128. The OD service 120 can be configured to return an OD solution for one of the satellites 102a-102c based on a client request to user interface 122. For example, the user interface 122 can be a web-based GUI when the client request is directly from one of the users 106a-106c. Alternatively, the user interface 122 can be an API, for example, when the client request is from the ground station service 112 in response to a request from one of the users 106a-106c to ground station service 112 for communication with one of the satellites 102a-102c, when a user 106a-106c programmatically submits a request for OD of one of the satellites 102a-102c, and/or when a user 106a-106c or other source sends measurement data to the OD service for determining an OD solution. For example, the API of user interface 122 can function as an endpoint that allows programmatic integration of the OD service 120 into existing satellite operation systems.

The data storage service 128 can store therein various data employed by the OD service 120 in determining an OD. For example, the data storage service 128 can store therein various resource types. In some examples, data corresponding to satellite positioning measurements, satellite parameters, and/or other satellite information may be stored in data storage service 128 to be used in determination of an OD. The data storage service 128 can provide any type of data storage, such as, but not limited to, a block-based storage service that provides block-storage resources to compute instances of a compute service, an object-based storage service that stores data objects, a cold storage service that provides a low-cost storage solution for infrequently accessed data objects, or a database. In an exemplary embodiment, the data storage service 128 can be a cloud-based nonSQL database service, such as Amazon Web Services (AWS) DynamoDB.

The OD determination service 126 can employ a predictor-corrector methodology to prepare an OD for the requested satellite. For example, when operating in a sensor fusion mode, the OD determination service 126 takes a last-known best state for the requested satellite based on performing sensor fusion processing to the output by the measurement collection service 124 (e.g., using aggregated information provided by the requesting client, previously determined by the OD service 120 and stored in data storage service 128, and/or measured by the ground station 104 or a third-party system) and propagates the state forward in time using physics models stored in the data storage service 128. Examples of physics models are described in more detail below with respect to FIG. 3. Although the fusion of sensor data decreases uncertainty relative to determinations based on measurements from a single measurement, the resulting predicted OD may still have a certain uncertainty, which can be reduced by correcting the predicted OD using further recent or real-time measurements of the satellite. For example, measurements 134 can be continuously or periodically retrieved for the OD service 120 via network 108 from various measurement sources including the users 106, the ground station 104, third-party data repositories 136 (e.g., NORAD Space-Track, etc.), and/or additional sources 138 (e.g., other ground stations at different geographic locations, celestial observatories, radar installations, GPS or other satellite-based navigation system tracking installations, etc.). The sensor fusion process 127 may be configured to collect and combine the measurement data 134 for use by the OD determination service 126 to improve the resulting OD. For example, during communication with a satellite, a user 106 may receive GPS or other satellite-based navigation system telemetry from the satellite (e.g., a GPS or other navigation system module on-board the satellite), which may be converted to real-time GPS or other satellite-based navigation system measurements and provided to the measurement collection service 124 (e.g., via an API call) for use by the OD determination service 126 to prepare an OD for the satellite using sensor fusion process 127. Other measurement data, such as auto track angles from an antenna or data storage, one-way ranging and/or doppler data, one-way time of flight ranging data, two-way ranging and/or doppler data, three-way ranging and/or doppler data, sequential range data, total count phase (TCP) data, azimuth/elevation angles, and/or other data pertaining to the positioning, structure (e.g., size, shape, drag characteristics, etc.), and movement of the satellite may be received from one or multiple sources in parallel with the GPS or other satellite-based navigation system data for use in the physics models to determine OD results.

As the measurements may be continuously received and/or updated from different sources, the measurement collection service 124 may continuously and/or periodically provide updated data to the OD determination service 126 to trigger updated OD results during communication with the satellite. As described in more detail below with respect to FIG. 2, these updated OD results may be used to update pointing instructions for the antenna 105 to enable the antenna to be repositioned multiple times (e.g., in real-time) in a single communication window with the satellite. The updated aiming of the antenna dramatically increases pAoS and QoS for the controlled high-gain antenna. This will further enable high pAoS and QoS for more exotic directed systems, such as Low Earth Orbit (LEO) Ka-band, phased array, and LASER communications systems.

In some embodiments, the ground station service 112 may be configured to switch between antenna pointing methods based on user input and/or measurement data availability. For example, for a first attempt to establish communications with a satellite (e.g., prior to the receipt of real-time GPS or other satellite-based navigation system data from the satellite) and/or when GPS or other satellite-based navigation system data for the satellite is otherwise unavailable (e.g., not provided by a user), the hardware controller may issue pointing instructions based on a Program Track method or an Auto Track method (e.g., based on available data and/or user settings). For the Program Track method, the ground station service 112 (utilizing the hardware controller 116) may control the antenna to follow a predetermined path using a last-calculated OD result, and the OD determination service may not be triggered until the pointing methodology is switched. For the Auto Track method, the OD determination service 126 may generate OD results using information from RF beacon signals received by the antenna 105 (e.g., without using other data). Once GPS or other satellite-based navigation system data is available, or responsive to user selection to switch pointing mechanisms to a Sensor-fused Program Track mechanism, the OD determination service 126 may be configured to generate OD results using data combined via sensor fusion process 127, including GPS or other satellite-based navigation system measurements for a targeted satellite as received from a user, and other data, which may include the data used for the above-described Auto Track and/or Program Track methods.

In some embodiments, user interface 122 can allow a user 106 to modify the OD provided by OD service 120. For example, a user may wish to ignore certain measurement data that is physically inconsistent with the state of the satellite and thus would degrade the accuracy of the OD if incorporated. Via user interface 122, the user can review and omit the measurement data applied to correct the predicted OD. Alternatively or additionally, the user can add or select measurement data via user interface 122 to be applied by the OD service 120 to further correct the predicted OD.

In some embodiments, OD service 120 can instantiate one or more session instances using virtualized compute resources of another service of a compute service provider 110 that includes the ground station service 112. In some embodiments, the session instances may include a sensor fusion instance, for example, to combine measurement data from multiple sources for use in generating OD results. For example, a virtual compute instance can be implemented on one or more resource hosts included in a data center that comprises one or more servers with a specified computational capacity (e.g., indicated by the type and number of central processing units (CPUs), memory size, etc.) and a specified software stack (e.g., a particular version of an operating system, which may run on top of a hypervisor). In different embodiments, various computing devices can be employed alone or in combination to implement the compute instances of virtual compute services (e.g., ground station service 112 and/or OD service 120), including special purpose computer servers, storage devices, network devices, etc. In an exemplary embodiment, the OD service 120 can provide the user interface 122 as an API using, for example, AWS API Gateway, and can provide OD determination service 126 and/or model service 124 via a serverless computing platform such as AWS Lambda. Alternatively, physical computing resources can be used for session instances of the ground station service 112 and/or OD service 120 in place of or in addition to virtual compute resources.

Clients of compute service provider 110 (e.g., users 106) and/or clients of OD service 112 (e.g., ground station service 112) encompass any type of client configurable to submit requests thereto. In some embodiments, clients include satellite owners/operators and/or other clients of a compute service provider 110. For example, a client includes a suitable version of a web browser, a plug-in module or other type of code module configured to execute as an extension to or within an execution environment provided by a web browser, or any other type of web-enabled application.

Alternatively or additionally, a client encompasses an application, such as but not limited to, a database application (or user interface thereof), a media application, an office application, or any other application that employs compute instances of a compute service, or other network-based services in compute service provider 110 to perform various operations. In some embodiments, such an application may include sufficient protocol support (e.g., for Hypertext Transfer Protocol (HTTP)) to generate and process network-based service requests without otherwise requiring full browser support for all types of network-based data. In some embodiments, clients generate network-based service requests to either ground station service 112 or OD service 120 according to a Representational State Transfer (REST)-style network-based service architecture, a document- or message-based network-based service architecture, or another suitable network-based service architecture.

Figure 2:
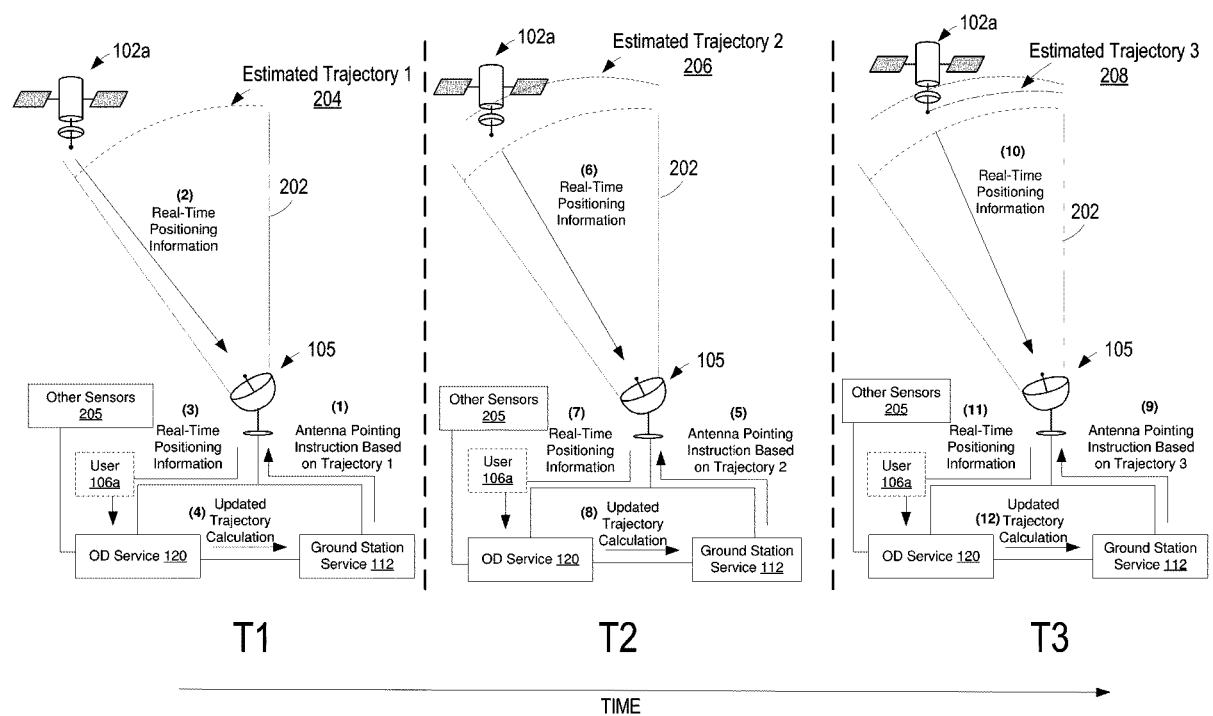
FIG. 2 is an illustrative diagram of an example process for updating a pointing angle for an antenna in real-time during communication with a satellite, according to one or more embodiments of the disclosed subject matter.

FIG. 2 illustrates an example process for updating antenna pointing instructions for an antenna in real time, using a fusion of sensor data, while a satellite passes within communication range of the antenna. Time frames T1, T2, and T3 represent progressive time frames of a single window of communication with the satellite 102*a*. Accordingly, the passage of time from time frame T1 to time frame T3 may be a portion of the total duration of the communication window. As a non-limiting example in which a satellite is in range and/or in communication with an antenna for a 15 minute window, the amount of time to complete time frames T1 to T3 may be approximately 5 minutes. As described below, while FIG. 2 illustrates a portion of the communication window, it is to be understood that some operations may occur iteratively and/or periodically until the communication window is closed (e.g., some time after time frame T3 and before the satellite comes into range of the antenna on a next orbital pass).

Time frame T1 represents an initial time frame that includes a point in time when the satellite first arrives within communication range 202 of the antenna 105 and/or during which a sensor fusion process is first initiated. As indicated at (1) the ground station service 112 issues an antenna pointing instruction that controls the pointing angle of the antenna 105 based on Trajectory 1 (represented at 204). Trajectory 1 may be determined based on last-known data regarding the positioning and movement of the satellite 102*a*. For example, Trajectory 1 may be based on a Program Track or Auto Track pointing method as described above. The Trajectory 1 is based on outdated information, resulting in the offset between the satellite's illustrated position and the estimated trajectory.

At (2) the satellite sends real-time positioning information to the antenna. The real-time positioning information may include raw positioning/GPS/other satellite-based navigation system data from an on-board sensor of the satellite 102*a* and/or GPS or other satellite-based navigation system data that has been processed on-board the satellite 102*a*. The raw positioning/GPS/other satellite-based navigation system data may include output from the on-board sensor that is otherwise unprocessed and/or output from the on-board sensor that is processed and/or encrypted according to a configuration of the satellite. At (3) the real-time positioning information is propagated to the OD service 120. As shown, the real-time positioning information may be provided to a user 106*a* (e.g., the user requesting communication with satellite 102*a* during the illustrated communication window), and the user 106*a* may convert the data into usable GPS or other satellite-based navigation system measurements for the OD service. For example, the raw positioning/GPS/other satellite-based navigation system data from the satellite may be encrypted and/or the data may otherwise not be usable by the ground station and OD service (e.g., to determine an OD of the satellite based on the data) until decrypted and/or formatted by the user 106*a*. In other examples, OD service and/or the ground station service may be configured to utilize the raw data as received directly from the satellite 102*a*. The OD service 120 is also shown as receiving data from other sensors 205. As described above with respect to FIG. 1, the OD service may fuse the GPS or other satellite-based navigation system data corresponding to the real-time positioning information from the satellite with other data received from other sources (e.g., the ground station service, the antenna, the user, other ground stations, data repositories, etc.) in order to determine an OD result corresponding to an updated trajectory calculation, as indicated at (4).

The updated trajectory calculation provided at (4) may correspond to an updated Trajectory 2, shown at 206. As shown in time frame B, the ground station service 112 uses the updated trajectory received at (4) to issue an updated antenna pointing instruction to the antenna 105 based on Trajectory 2, as indicated at (5). As shown, the satellite has moved from the position shown in time frame A and, since Trajectory 2 is based on more up-to-date positioning information than Trajectory 1, the satellite 102*a* is closer to Trajectory 2 than Trajectory 1. In this way, pointing the antenna 105 to follow Trajectory 2 is more likely to increase pAoS and QoS of the communication between the antenna and the satellite.

At (6) further real-time pointing information is communicating from the satellite to the antenna, and propagated (at (7)) to the OD service 120. As described for time frame A, the OD service uses the real-time positioning information (e.g., optionally as converted by user 106*a*, and in combination with data from other sensors 205) to generate an updated trajectory calculation, as indicated at (8).

The updated trajectory calculation provided at (8) may correspond to an updated trajectory 3, shown at 208. As shown in time frame C, the ground station service 112 uses the updated trajectory received at (8) to issue an updated antenna pointing instruction to the antenna 105 based on Trajectory 3, as indicated at (9). As shown, the satellite has moved from the position shown in time frame B and, since Trajectory 3 is based on even more up-to-date positioning information than Trajectory 2, the satellite 102*a* is closer to Trajectory 3 than Trajectory 2, resulting in a further increase in pAoS and QoS of the communication between the antenna and the satellite. The method may continue by providing further real-time information at (10), propagating the real-time information to the OD service 120 at (11), and generating a further updated trajectory calculation at (12).

It is to be understood that the above-described processes may be performed continuously and/or periodically throughout the communication window in which the satellite is in communication with the antenna in order to provide updated pointing angles for the antenna with increased accuracy throughout the communication window. In some examples, the above-described processes may be performed continuously or semi-continuously until feedback (e.g., updated real-time positioning information from the satellite) indicates that a last-estimated trajectory has an estimated accuracy within a threshold (e.g., where the real-time positioning information from the satellite places the satellite substantially on the last-estimated trajectory or otherwise within a threshold distance of the last-estimated trajectory). Once the threshold accuracy is achieved, the updating of trajectory calculations and/or the real-time positioning information receipt may be stopped until a next communication window in some examples. In other examples, once the threshold accuracy is achieved, real-time positioning information may still be received periodically (e.g., at a slower rate than before the accuracy threshold is met) and the updating of trajectory calculations may be stopped for the communication window until/unless the received real-time positioning information indicates that the satellite has deviated from the last-estimated trajectory by a threshold amount (e.g., the estimated accuracy falls below the threshold and/or below a different, secondary threshold). In still other examples, once the threshold accuracy is achieved, the updating of trajectory calculations and/or the real-time positioning information receipt may be slowed to a periodic rate that is lower than the rate of calculations/information retrieval performed prior to achieving the threshold accuracy.

In some examples, the real-time positioning information may be collected by the user 106a over time and provided to the OD service 120 as a batch of data in order to control the timing of updated satellite trajectory (and resulting antenna pointing angle) calculations. For example, the client device associated with the user 106a may be configured to process raw positioning data from the satellite in batches that include a threshold number of samples or a number of samples collected over a predetermined threshold period of time. In this way, OD determinations may be carried out for each batch, and thus timed based on the time it takes for the client device to receive and convert the batch of raw positioning data into positioning data (e.g., GPS data) that is useable by the OD service for determining an OD for the satellite.

Figure 3:
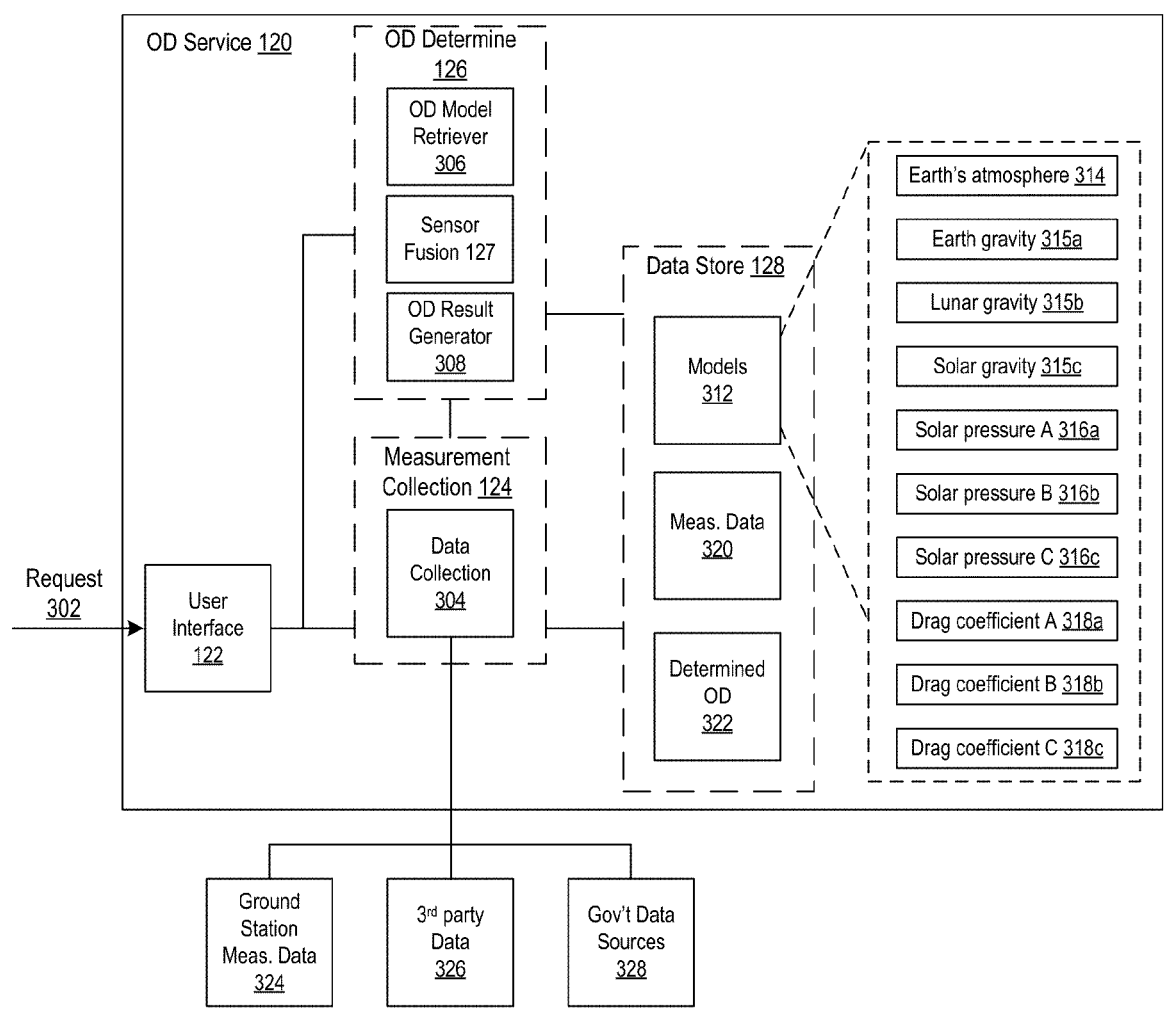
FIG. 3 is a schematic diagram illustrating aspects of an orbit determination service, according to one or more embodiments of the disclosed subject matter.

Referring to FIG. 3, further details of the OD service 120 are illustrated. The OD service 120 can receive a request 302 for OD at user interface 122. In embodiments, the request 302 can include any information that sufficiently identifies the satellite. For example, the request 302 can include a satellite identifier, such as a NORAD Catalog Number, NORAD ID, NASA catalog number, US SPACECOM object number, a catalog number and similar variants, a Committee on Space Research (COSPAR) number, etc. Alternatively or additionally, the request 302 can include measurement data of the satellite, such as point angles, ranging data, GPS telemetry, celestial image data, etc.

The measurement collection service 124 can include a data collection module 304, which receives measurement data (e.g., point angles, ranging data, GPS telemetry, celestial image data, etc. pertaining to the satellite identified in the request 302) from multiple sources. For example, the data collection module 304 may request and receive latent or current measurement data 324 from a ground station, such as ground station 104 of FIG. 1, latent or current measurement data 326 from third party measurement providers (e.g., celestial observatories, radar installations, GPS or other satellite-based navigation system tracking installations, etc.) and/or latent or current measurement or tracking data 328 from governmental sources (e.g., International Earth Rotation and Reference Systems Service (IERS), National Oceanic and Atmospheric Administration (NOAA) National Environmental Satellite, Data, and Information Service (NESDIS), NORAD Space-Track, etc.). Alternatively or additionally, measurement data can be provided as part of the original request 302 from the client and provided to the data collection module 304 by user interface 122. In still other examples, measurement data may be retrieved by the data collection module 304 from stored measured data 320 of data store 128.

The OD determination service 126 can include an OD model retriever 306, which receives the satellite identification information from the user interface 122 and the collected sensor data from the measurement collection service 124. The OD model retriever 306 can be configured to request and receive model resources 312 from data store 128 that correspond to the types of information available for the satellite (e.g., from the measurement collection service 124).

The OD result generator 308 may be configured to use the model resources 312 in determining an OD for the satellite, for example, by propagating the last-known best state forward in time using the models retrieved by OD model retriever 306 and a fusion of sensor data processed (e.g., convolved) by the sensor fusion process 127. The OD result generator 308 may further request and receive data of a last-known best state for the satellite from data store 128, or the request 302 may include the last-known best state which is forwarded from the user interface 122 to the OD result generator 308. In some embodiments, the model resources 312 includes a globally optimized model (e.g., optimized based on prior OD determinations for a variety of satellites), such as model 314 of Earth's atmosphere and models 315a-315c for Earth gravity, lunar gravity, and solar gravity, and a satellite specific model (e.g., optimized according to the particulars of the satellite), such as respective models 316a-316c for solar radiation pressure designed based on the specific geometries of satellites 106a-106c or respective models 318a-318c for drag coefficient designed based on the specific geometries of satellites 106a-106c. The OD result generator may use any suitable mechanism for solving an orbit determination function using sensor fusion and physical models. An example approach includes using OREKIT orbit determination, which may utilize least squared estimators, Kalman estimators, and/or other approaches to convolve sensor data and generate an orbit determination. Generated ODs may be stored in determined OD module 322 of data store 128 for future use as a last-known best state.

Figure 4:
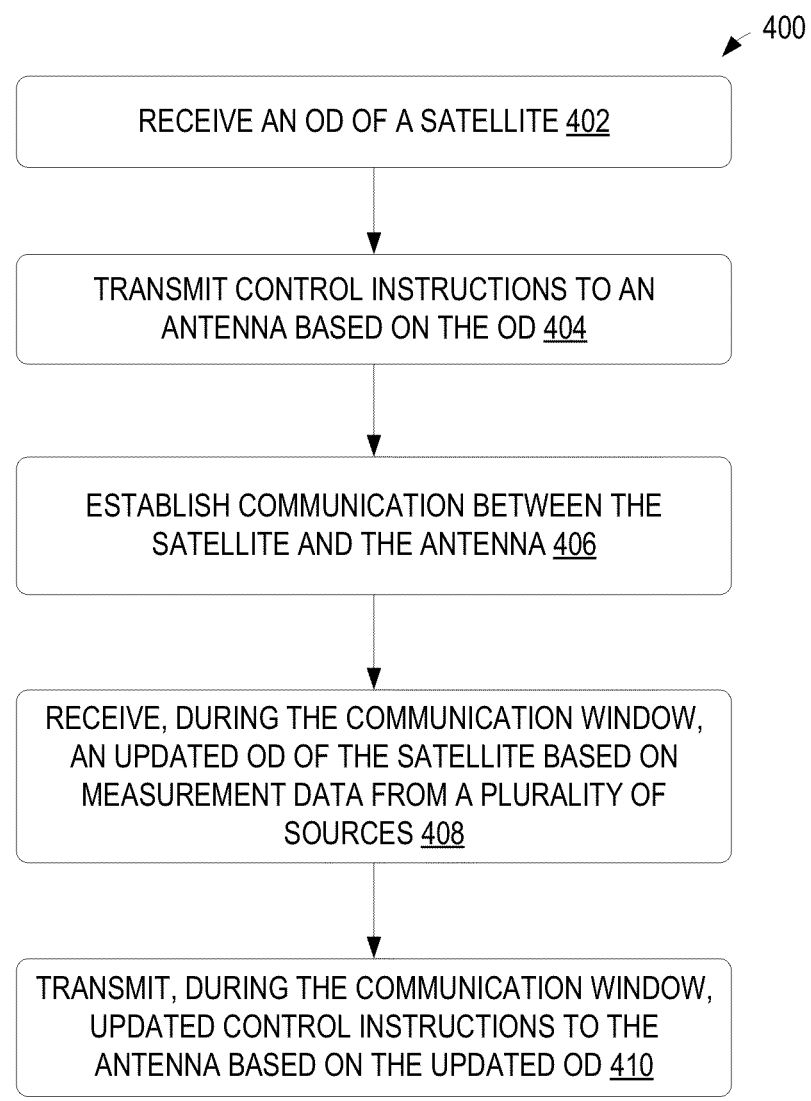
FIG. 4 is a process flow diagram of an example method for controlling an antenna using a combination of sensor data, according to one or more embodiments of the disclosed subject matter.

FIG. 4 shows an example method 400 for controlling an antenna using a combination of sensor data. For example, method 400 may be performed by a ground station service, such as ground station service 112 of FIG. 1, using information retrieved from an orbit determination service, such as OD service 120 of FIG. 1.

At 402, the method includes receiving an orbit determination (OD) of a satellite. For example, the satellite may be identified based on a request received from a client device to establish communication with the satellite. The OD may in some examples be based on information from one or more data sources, which may include current and/or latent data regarding an orbit of the satellite.

At 404, the method includes transmitting control instructions to an antenna based on the OD received at 402. The control instructions may include instructions that are configured to control the antenna to have one or more pointing angles at one or more specified times in order to track the satellite. The pointing angles may be based on an expected trajectory of the satellite, which is identified by the OD received at 402. If real-time information is not available (e.g., prior to establishment of communication with the satellite), the control instructions provided at this time may correspond to pointing angles that are derived according to an Auto Track or Program Track method, as described above.

At 406, the method includes establishing communication between the satellite and the antenna. For example, the satellite may be in communication range of the antenna and may communicate data over a communication window (e.g., the communication window may correspond to the time in which the satellite is in range of the antenna and/or a negotiated time period when the antenna is approved to communicate with the antenna). During the communication window, the satellite may transmit and/or receive client data (e.g., based on a communication request received from a client device) as well as additional satellite data (e.g., satellite health data, satellite positioning information, etc.).

At 408, the method includes receiving, during the communication window, an updated orbit determination of the satellite based on measurement data from a plurality of sources. For example, while the satellite is in communication range of the antenna, the real-time positioning information from the data, as well as measurement data from one or more other data sources (e.g., auto track angles from an antenna, one-way time of flight ranging data, one-way doppler and/or ranging data, two-way ranging and/or doppler data, three-way ranging and/or doppler data, total count phase (TCP) data, sequential ranging data, etc.) may be combined and used to determine an updated OD for the satellite.

At 410, the method includes transmitting, during the communication window, updated control instructions to the antenna based on the updated OD received at 408. For example, the updated OD may be used to calculate updated pointing angles that correspond to controlling the antenna to track the satellite along an updated trajectory derived from the updated OD. As the updated OD is based on a combination of data including real-time data, the updated pointing angles have an increased accuracy relative to pointing angles that are based on outdated information. The illustrated method of FIG. 4 shows an example of updating the control instructions once during a communication window, however, it is to be understood that the antenna may be controlled to update pointing angles based on updated ODs multiple times during a communication window. An example of such an iterative process is described in more detail below with respect to FIG. 5.

Figure 5:
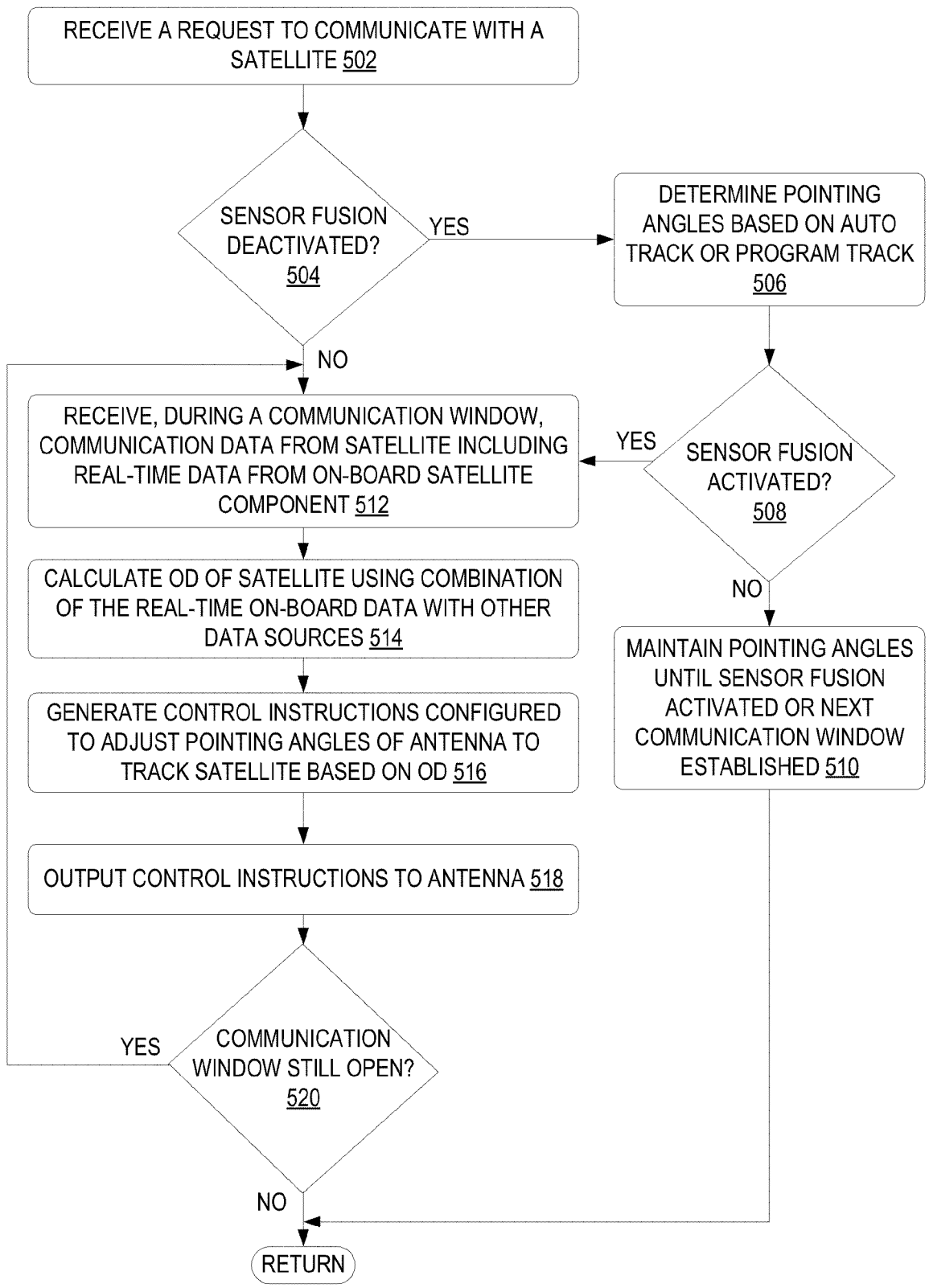
FIG. 5 is a process flow diagram of another example method for controlling an antenna using a combination of sensor data, according to one or more embodiments of the disclosed subject matter.

FIG. 5 is a process flow diagram of another example method 500 for controlling an antenna using a combination of sensor data. For example, method 500 may be performed by a ground station service, such as ground station service 112 of FIG. 1, using information retrieved from an orbit determination service, such as OD service 120 of FIG. 1.

At 502, the method includes receiving a request to communicate with a satellite. For example, a client device may issue a request for establishing communication (e.g., during a specified communication window) with a requested satellite. At 504, the method includes determining if sensor fusion is deactivated (e.g., based on a user setting and/or based on available sensor/measurement data). Sensor fusion may be deactivated if real-time positioning information is not available (e.g., if the antenna is not currently in communication with the satellite), if sensor information from only one source is available, and/or if a user has opted to not perform sensor fusion (e.g., if the user has requested to determine pointing angles via another mechanism, such as Auto Track or Program Track, which are described in more detail above).

If sensor fusion is deactivated (e.g., "NO" at 504), the method proceeds to 506 and includes determining pointing angles for the antenna based on Auto Track or Program Track (or another antenna pointing mechanism that does not combine sensor data from multiple sources and/or does not use real-time sensor data). At 508, the method includes determining if sensor fusion has been activated. As described above, sensor fusion may be activated responsive to user selection or once real-time/multi-source data is made available. For example, prior to establishing communication with the satellite, the antenna may be controlled to have the pointer angles determined at 506, and once communication is established (and real-time positioning information from the satellite is received), the sensor fusion may be considered to be activated. If sensor fusion has not been activated (e.g., "NO" at 508), the method proceeds to 510 and includes maintaining pointing angles (e.g., controlling the antenna according to the pointing angles determined at 506) until sensor fusion is activated or a next communication window is established. In this way, if sensor fusion is not performed, the pointing angles are only derived once per communication window and are based on data other than real-time data.

If sensor fusion is activated (e.g., "YES" at 508 or "NO" at 504), the method proceeds to 512 and includes receiving, during a communication window, communication data from the satellite, including real-time data from an on-board satellite component (e.g., an on-board GPS or other navigation system component, which may provide positioning data for the satellite). At 514, the method includes calculating an OD of the satellite using a combination of the real-time on-board data with other data sources (e.g., auto track angles from an antenna, one-way time of flight ranging data, one-way doppler and/or ranging data, two-way ranging and/or doppler data, three-way ranging and/or doppler data, total count phase (TCP) data sequential ranging data, etc.).

At 516, the method includes generating control instructions configured to adjust pointing angles of the antenna to track the satellite based on the OD calculated at 514. At 518, the method includes outputting the control instructions to the antenna. In this way, while sensor fusion is activated, the antenna is controlled to have pointing angles that are based on data from multiple data sources, which may include updated/real-time positioning information (e.g., data from a satellite-based navigation system, such as GPS data) derived from an on-board component of the satellite.

At 520, the method includes determining if the communication window is still open. If the communication window is not still open (e.g., "NO" at 520), the method returns to wait for a next request to communicate with a satellite. If the communication window is still open (e.g., "YES" at 520), the method returns to 512 to continue receiving communication data from the satellite and calculate updated ODs, from which updated pointing angles are derived and used to further adjust the pointing of the antenna to track the satellite with increased accuracy based on updated real-time data and data from multiple sources. In this way, the method may continue iteratively performing the operations 512-518 with updated data in order to effect multiple antenna pointing adjustments during a single communication window. As described above and illustrated in FIG. 2, such an iterative process increases pAoS and QoS for communications between a satellite and an antenna by using more accurate, real-time data than other pointing mechanisms.

Figure 6:
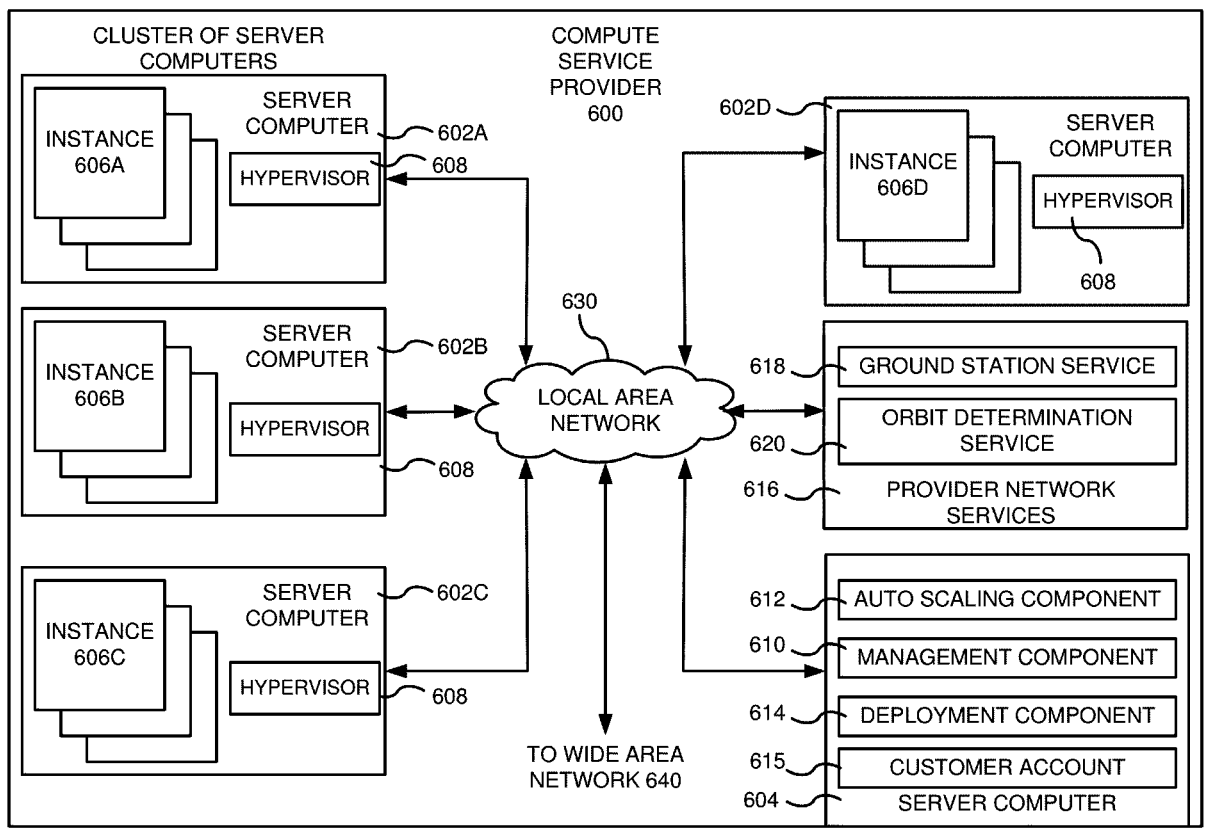
FIG. 6 is an example system diagram showing a plurality of virtual machine instances running in a multi-tenant environment.

FIG. 6 is a computing system diagram of a network-based compute service provider 600 that illustrates one environment in which embodiments described herein can be used. By way of background, the compute service provider 600 (i.e., the cloud provider) is capable of delivery of computing and storage capacity as a service to a community of end recipients. In an example embodiment, the compute service provider can be established for an organization by or on behalf of the organization. That is, the compute service provider 600 may offer a "private cloud environment." In another embodiment, the compute service provider 600 supports a multi-tenant environment, wherein a plurality of clients operate independently (i.e., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. For the IaaS model, the compute service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 600 using networked client devices, such as desktop computers, laptops, tablets, smartphones, etc. running web browsers or other lightweight client applications. Those skilled in the art will recognize that the compute service provider 600 can be described as a "cloud" environment.

Services are commonly used in cloud computing. A service is a software function provided at a network address over the web or the cloud. Clients initiate service requests to servers and servers process the requests and return appropriate responses. The client service requests are typically initiated using, for example, an API request. For purposes of simplicity, service requests will be generally described herein as API requests, but it is understood that other service requests can be made. An API request is a programmatic interface to a defined request-response message system, typically expressed in JSON or XML, which is exposed via the web-most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a service receives the API request from a client device, the service can generate a response to the request and send the response to the endpoint identified in the request.

The particular illustrated compute service provider 600 includes a plurality of server computers 602A-602D. While only four server computers are shown, any number can be used, and large centers can include thousands of server computers. The server computers 602A-602D can provide computing resources for executing software instances 606A-606D. In one embodiment, the instances 606A-606D are virtual machines. As known in the art, a virtual machine is an instance of a software implementation of a machine (i.e. a computer) that executes applications like a physical machine. In the example of virtual machine, each of the servers 602A-602D can be configured to execute a hypervisor 608 or another type of program configured to enable the execution of multiple instances 606 on a single server. Additionally, each of the instances 606 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 604 can be reserved for executing software components for managing the operation of the server computers 602 and the instances 606. For example, the server computer 604 can execute a management component 610. A client can access the management component 610 to configure various aspects of the operation of the instances 606 purchased by the client. For example, the client can purchase, rent or lease instances and make changes to the configuration of the instances. The client can also specify settings regarding how the purchased instances are to be scaled in response to demand. The management component can further include a policy document to implement client policies. An auto scaling component 612 can scale the instances 606 based upon rules defined by the client. In one embodiment, the auto scaling component 612 allows a client to specify scale-up rules for use in determining when new instances should be instantiated and scale-down rules for use in determining when existing instances should be terminated. The auto scaling component 612 can consist of a number of subcomponents executing on different server computers 602 or other computing devices. The auto scaling component 612 can monitor available computing resources over an internal management network and modify resources available based on need.

A deployment component 614 can be used to assist clients in the deployment of new instances 606 of computing resources. The deployment component can have access to account information associated with the instances, such as who is the owner of the account, credit card information, country of the owner, etc. The deployment component 614 can receive a configuration from a client that includes data describing how new instances 606 should be configured. For example, the configuration can specify one or more applications to be installed in new instances 606, provide scripts and/or other types of code to be executed for configuring new instances 606, provide cache logic specifying how an application cache should be prepared, and other types of information. The deployment component 614 can utilize the client-provided configuration and cache logic to configure, prime, and launch new instances 606. The configuration, cache logic, and other information may be specified by a client using the management component 610 or by providing this information directly to the deployment component 614. The instance manager can be considered part of the deployment component.

Client account information 615 can include any desired information associated with a client of the multi-tenant environment. For example, the client account information can include a unique identifier for a client, a client address, billing information, licensing information, customization parameters for launching instances, scheduling information, auto-scaling parameters, previous IP addresses used to access the account, etc.

Examples of provider network services 616 that may be offered by the compute service provider 600 include a ground station service 618 and an orbit determination service 620. For example, the ground station service 618 may be implemented by a ground station, such as ground station 104 of FIG. 1 (e.g., to perform operations as described with respect to ground station service 112 of FIGS. 1 and 2). The orbit determination service 620 may be implemented by the ground station and/or another device of the compute service provider network to which the ground station belongs (e.g., to perform operations as described with respect to OD service 120 of FIGS. 1-3). In this way, the provider network services 616 may provide antenna pointing services based on sensor fused program track mechanisms, as described herein, to allow one or more client devices to communicate with a satellite using an antenna, where such communications may be at least partially coordinated and controlled by the compute service provider 600.

A network 630 can be utilized to interconnect the server computers 602A-602D and the server computer 604. The network 630 can be a local area network (LAN) and can be connected to a Wide Area Network (WAN) 640 so that end users can access the compute service provider 600. It should be appreciated that the network topology illustrated in FIG. 6 has been simplified and that many more networks and networking devices can be utilized to interconnect the various computing systems disclosed herein.

Figure 7:
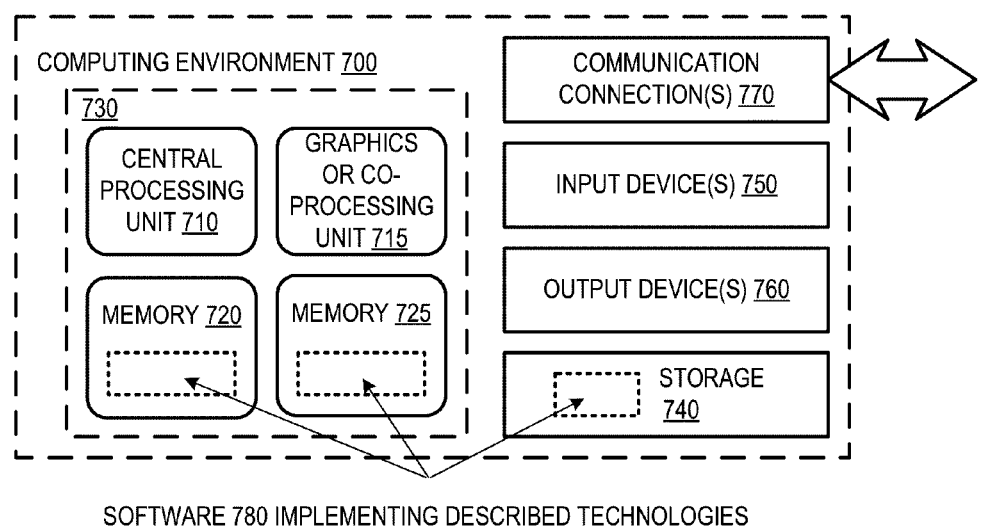
FIG. 7 depicts a generalized example of a suitable computing environment in which the described innovations may be implemented.

FIG. 7 depicts a generalized example of a suitable computing environment 700 in which the described innovations may be implemented. For example, the computing environment 700 may be an example of a computing environment in which ground station service 112 of FIGS. 1 and 2, the OD service 120 of FIGS. 1-3, and/or other services, modules, and/or devices described herein are implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.).

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multiprocessing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A satellite service, comprising:
   a satellite ground station having an antenna for communicating with a satellite;
   one or more computing devices for controlling an orientation of the antenna to communicate with the satellite, the one or more computing devices being configured to:
   receive, from a client device, a request to communicate with the satellite;
   calculate a first orbit determination (OD) of the satellite using sensor data from a first data source;
   generate control instructions configured to adjust pointing angles of the antenna to track the satellite based on the first OD;
   output the control instructions to the antenna;
   receive, during a communication window between the antenna and the satellite in which the satellite is in communication range with the antenna, communication data from the satellite, the communication data including real-time satellite-based navigation system data derived from an onboard navigation system component of the satellite; and
   throughout the communication window:
   iteratively calculate respective updated ODs of the satellite using sensor data from a plurality of data sources, the sensor data from the plurality of sources including the real-time satellite-based navigation system data;
   iteratively generate respective updated control instructions configured to adjust pointing angles of the antenna to track the satellite based on the respective updated ODs; and
   iteratively output the respective updated control instructions to the antenna.

2. The satellite service of claim 1, wherein the first OD is calculated prior to receiving the real-time satellite-based navigation system data from the satellite.

3. The satellite service of claim 1, wherein the plurality of data sources includes the client device, the ground station, a further remote ground station, or a third-party data repository.

4. The satellite service of claim 1, wherein the one or more computing devices are further configured to transmit raw satellite-based navigation system information from the onboard navigation system component of the satellite to the client device for conversion into the satellite-based navigation system data, wherein the satellite-based navigation system data is received from the client device.

5. The satellite service of claim 1, wherein the respective updated ODs are calculated using a combination of the satellite-based navigation system data with one-way ranging data, one-way doppler data, one-way time of flight ranging data, two-way ranging data, two-way doppler data, three-way doppler data, three-way ranging data, total count phase (TCP) data, sequential range data, or azimuth/elevation angle data.

6. A computer-implemented method, comprising:
   receiving, from an orbit determination service, an orbit determination (OD) of a satellite;
   transmitting control instructions to an antenna, the control instructions configured to adjust pointing angles of the antenna based on the OD of the satellite;
   establishing communication between the satellite and the antenna and communicating data between the satellite and the antenna during a communication window in which the satellite is in communication range of the antenna;
   receiving, from the orbit determination service during the communication window, an updated OD of the satellite based on satellite measurement data from a plurality of sources; and
   transmitting, during the communication window, updated control instructions to the antenna, the updated control instructions configured to further adjust pointing angles for the antenna based on the updated OD of the satellite.

7. The computer-implemented method of claim 6, wherein the satellite measurement data includes positioning data derived from an on-board component of the satellite.

8. The computer-implemented method of claim 7, further comprising receiving raw positioning data from the on-board component of the satellite during the communication window and transmitting the raw positioning data to a client device for conversion into the positioning data included in the satellite measurement data.

9. The computer-implemented method of claim 7, wherein the positioning data is received from the client device via an Application Programming Interface (API) call.

10. The computer-implemented method of claim 7, wherein the positioning data is received directly from the satellite.

11. The computer-implemented method of claim 7, wherein the satellite measurement data further includes one-way ranging data, one-way doppler data, one-way time of flight ranging data, two-way ranging data, two-way doppler data, three-way doppler data, three-way ranging data, total count phase (TCP) data, sequential range data, or azimuth/elevation angle data.

12. The computer-implemented method of claim 11, wherein the satellite measurement data further includes structure data for the satellite.

13. The computer-implemented method of claim 7, wherein the satellite measurement data further includes previously-computed auto tracking angles received from the antenna or a data storage device associated with the antenna.

14. The computer-implemented method of claim 6, wherein the computer-implemented method is performed at a ground station service connected to a ground station that includes the antenna, wherein the satellite measurement data includes satellite-based navigation system data received from a sensor on-board the satellite and additional data received from a client device, the ground station, a further remote ground station, or a third-party data repository.

15. The computer-implemented method of claim 6, further comprising receiving a plurality of further updated ODs of the satellite based on updated satellite measurement data received from the plurality of sources, and transmitting, during the communication window, a plurality of further updated control instructions to the antenna, each of the further updated control instructions configured to further adjust pointing angles for the antenna based on a respective one of the plurality of further updated ODs of the satellite.

16. A system comprising:
   a communication interface communicatively coupled to an antenna;
   one or more processors; and
   a storage device storing instructions executable by the one or more processors to:
     receive a request from a client device to communicate with a satellite;
     receive, from an orbit determination service, an orbit determination (OD) of the satellite using information from the request;
     calculate pointing angles for the antenna based on the OD of the satellite;
     transmit, via the communication interface, control instructions to the antenna including the generated pointing angles;
     receive, at the communication interface, data from the satellite via the antenna during a communication window in which the satellite is within communication range of the antenna;
     receive, from the orbit determination service during the communication window, an updated OD of the satellite based on satellite measurement data from a plurality of sources, the satellite measurement data including positioning data derived from an on-board component of the satellite;
     calculate updated pointing angles for the antenna based on the updated OD of the satellite; and
     transmit, via the communication interface, updated control instructions to the antenna during the communication window, the updated control instructions including the updated pointing angles for the antenna.

17. The system of claim 16, wherein the positioning data is derived from raw positioning data communicated by the satellite during the communication window.

18. The system of claim 16, wherein the positioning data is received from the satellite or the client device and wherein the plurality of sources of satellite measurement data includes a ground station associated with the antenna or a third-party data repository remote from the client device and the ground station associated with the antenna.

19. The system of claim 16, wherein the satellite measurement data further includes one-way ranging data, one-way doppler data, one-way time of flight ranging data, two-way ranging data, two-way doppler data, three-way doppler data, three-way ranging data, total count phase (TCP) data, sequential range data, or azimuth/elevation angle data and wherein the OD and the updated OD are further based on structural data of the satellite.

20. The system of claim 16, wherein the OD is determined based on data received prior to the communication window, wherein the updated OD is determined based on data received during the communication window, and wherein the control instructions are configured to control the antenna to change orientation according to the updated pointing angles during the communication window.

* * * * *